US010597310B2

(12) United States Patent
Daumer et al.

(10) Patent No.: US 10,597,310 B2
(45) Date of Patent: Mar. 24, 2020

(54) METHOD OF RECOVERING IRON AND/OR PHOSPHORUS FROM SLUDGE OF WASTE WATER TREATMENT PLANTS

(71) Applicant: Institut national de Recherche en Sciences et Technologies pour l'Environnement et l'Agriculture (IRSTEA), Antony (FR)

(72) Inventors: Marie-Line Daumer, Saint-Brieuc-des-Iffs (FR); Etienne Braak, Savenay (FR)

(73) Assignee: Technologies pour l'Environnement et l'Agriculture (IRSTEA), Antony (FR)

(*) Notice: Subject to any disclaimer, the term of this patent is extended or adjusted under 35 U.S.C. 154(b) by 301 days.

(21) Appl. No.: 15/499,324

(22) Filed: Apr. 27, 2017

(65) Prior Publication Data

US 2018/0208481 A1    Jul. 26, 2018

(30) Foreign Application Priority Data

Jan. 25, 2017  (FR) ..................................... 17 50608

(51) Int. Cl.
*C02F 1/26* (2006.01)
*B01D 11/02* (2006.01)
(Continued)

(52) U.S. Cl.
CPC ................. *C02F 1/26* (2013.01); *B01D 11/02* (2013.01); *C02F 3/30* (2013.01); *C02F 11/004* (2013.01);
(Continued)

(58) Field of Classification Search
CPC ........ B01D 15/00; B01D 15/02; B01D 15/08; B01D 15/424; B01D 21/00; B01D 21/01;
(Continued)

(56) References Cited

U.S. PATENT DOCUMENTS

2013/0058846 A1    3/2013  Kuwano et al.

FOREIGN PATENT DOCUMENTS

EP          0755730          1/1997

OTHER PUBLICATIONS

Lee et al., Journal of Bioscience and Bioengineering, vol. 106, No. 1, 107-110, 2008 (Year: 2008).*
(Continued)

*Primary Examiner* — Allison G Fitzsimmons
(74) *Attorney, Agent, or Firm* — IPSILON USA, LLP (57) ABSTRACT

Method of recovering iron and/or phosphorus from sludge of waste water treatment plants, said sludge being obtained after precipitation by iron salts, wherein said method comprises separating sludge from waste water and submitting said sludge to a lactic fermentation to release a liquid phase where iron and phosphorus are dissolved. Lactic fermentation is performed with addition of a co-substrate rich in carbon, preferably rich in carbohydrate, in one single step of biological acidification or a sequencing biological acidification in two steps by first releasing phosphorus from the PAO contained in the sludge. Iron can then be recovered by means of a cationic exchange resin. Phosphorus can be recovered as struvite or calcium phosphate from the remaining solution substantially free from iron ions, after a precipitation step in presence of a magnesium or calcium source and a pH above 7.

13 Claims, 4 Drawing Sheets

(51) Int. Cl.
| | |
|---|---|
| *C02F 11/00* | (2006.01) |
| *C02F 11/04* | (2006.01) |
| *C02F 3/30* | (2006.01) |
| C02F 1/00 | (2006.01) |
| C02F 9/00 | (2006.01) |
| C02F 101/10 | (2006.01) |
| C02F 101/20 | (2006.01) |
| C02F 1/42 | (2006.01) |
| C02F 103/00 | (2006.01) |
| C02F 1/52 | (2006.01) |
| C02F 1/28 | (2006.01) |

(52) U.S. Cl.
CPC ............... *C02F 11/04* (2013.01); *C02F 1/00* (2013.01); *C02F 1/28* (2013.01); *C02F 1/42* (2013.01); *C02F 1/5245* (2013.01); *C02F 9/00* (2013.01); *C02F 2001/425* (2013.01); *C02F 2101/105* (2013.01); *C02F 2101/20* (2013.01); *C02F 2101/203* (2013.01); *C02F 2103/007* (2013.01); *C02F 2209/02* (2013.01); *C02F 2209/06* (2013.01); *C02F 2209/08* (2013.01); *C02F 2301/08* (2013.01); *C02F 2303/16* (2013.01)

(58) Field of Classification Search
CPC ........ B01D 21/26; B01D 24/00; B01D 24/02; B01D 24/28; B01D 24/46; B01D 37/00; B01D 37/03; B01D 39/00; B01D 39/10; B01D 39/14; B01D 63/00; B01D 63/08; B01D 2215/00; C02F 1/00; C02F 1/28; C02F 1/42; C02F 1/38; C02F 2001/425; C02F 1/52; C02F 1/5209; C02F 1/5245; C02F 1/5254; C02F 1/5263; C02F 1/542; C02F 1/58; C02F 3/28; C02F 3/00; C02F 11/00; C02F 11/004; C02F 11/008; C02F 11/02; C02F 11/04; C02F 11/12; C02F 11/121; C02F 11/14; C02F 2101/00; C02F 2101/10; C02F 2101/20; C02F 2101/203; C02F 2303/00; C02F 2303/06; C02F 2303/22
See application file for complete search history.

(56) References Cited

OTHER PUBLICATIONS

Cheng Xiang et al: "Iron(III) reduction-induced phosphate precipitation during anaerobic digestion of waste activated sludge," Separation and Purification Technology, vol. 143, Jan. 8, 2015 (Jan. 8, 2015), pp. 6-11, XP029201510.

F. Kato et al: 'Extraction efficiency of 1-11 phosphate from pre-coagulated sludge withNa HS',Water Science and Technology,vol. 54, No. 5,Sep. 1, 2006 (Sep. 1, 2006), p. 119.

Philipp Wilfert et al: 'The Relevance of Phosphorus and Iron Chemistry to the Recovery of Phosphorus from Wastewater: A Review', Environmental Science & Technology, vol. 49, No. 16, Aug. 18, 2015 (Aug. 18, 2015), pp. 9400-9414.

Search Report dated May 15, 2017.

\* cited by examiner

METHOD OF RECOVERING IRON AND/OR PHOSPHORUS FROM SLUDGE OF WASTE WATER TREATMENT PLANTS

FIELD OF THE INVENTION

The present invention relates to the field of waste water treatment. It relates more specifically to a method of recovering iron and/or phosphorus from sludge of waste water treatment plants.

BACKGROUND OF THE INVENTION

Phosphorus has been identified as main responsible for eutrophication in lake or river waters. Therefore, phosphorus removal is a special concern in the treatment process lines of the waste water treatment plants to minimize its release into the environment.

To this effect, urban and industrial waste water treatment plants uses generally chemical precipitation steps, for instance flocculation-coagulation steps by iron or aluminum salts, or by a more complex process called Enhanced Biological Phosphorus Removal (EBPR), often complemented by chemical precipitation to reach the legal limits.

However, chemical precipitation, yet the most used technique, increases the sludge production, its toxicity and its disposal costs. EBPR also produces large volumes of sludge containing phosphorus. To reduce the sludge volume, and/or produce energy, said sludge may be digested under anaerobic conditions at a pH above 6.5 to produce methane.

Iron salts, such as ferric chloride, are mostly used for these precipitation steps, but are easily combined with phosphorus to generate a precipitate of iron phosphate FePO4. Sludge issued from these waste water plants are thus charged both in iron and phosphorus. Iron present in said sludge combines with phosphorus which is therefore less available as agricultural fertilizer after sludge landfill disposal.

Recently it has been tried to extract phosphorus from said sludge to increase its value, particularly in the form of a magnesium ammonium phosphate hexahydrate, $MgNH_4PO_4 \cdot 6H_2O$, called struvite, that can be used as fertilizer. However, the presence of iron inhibits the crystallization of struvite and thus impairs the recovery of phosphorus.

In addition, it also appears that struvite could be spontaneously formed inside pipes and other equipments. Such crystallization should be controlled and avoided.

A first aim of the present invention is to remove iron from sludge of waste water treatment plants, said sludge being obtained after precipitation by iron salts, combined or not with EBPR (and having or not undergone an anaerobic digestion step), in order to allow phosphorus recycling.

Another aim of the invention is to propose a method of recovering both iron and phosphorus from said sludge of waste water treatment plants after precipitation of sludge by iron salts.

BRIEF SUMMARY OF THE INVENTION

Within the search work performed by the inventors, it has been discovered that, surprisingly, this iron could be redissolved from sludge by means of a biological process.

The present invention therefore proposes a method of recovering iron and/or phosphorus from sludge of waste water treatment plants, said sludge being obtained after precipitation by iron salts, wherein said method comprises separating sludge from waste water and submitting said sludge to a lactic fermentation to release a liquid phase where iron and phosphorus are dissolved.

By lactic fermentation is meant here an acidogen fermentation which produces organic acids and thus acidification of the medium, the organic acids comprising mainly lactic acid. It should not be confused with digestion where the process is controlled to avoid acidification, in order to produce methane.

More specifically, the step of dissolution of iron and phosphorus into said liquid phase comprises submitting said sludge to a lactic fermentation with substrates that are rich in easily biodegradable carbon. These substrates, also called co-substrates, are added to the organic matter already contained in the sludge. By substrates that are rich in easily biodegradable carbon is meant compounds that are easily and quickly assimilated by microorganisms which are present in these waste water sludges.

Said substrates rich in easily biodegradable carbon are substrates which are preferably rich in carbohydrates, such as sugars or greases, leading, during fermentation, to organic acids production and acidification of the medium to a pH value equal or below 5, preferably to a pH about 4. Said substrates rich in carbohydrates are for instance chosen among saccharose or glucose, and their derivatives, agricultural industrial or urban organic wastes, crops and crop residues or parts or extracts thereof.

Iron Recovery:

The lactic fermentation step is an anaerobic or anoxic fermentation step which is performed at a temperature comprised between 20° C. and 60° C., preferably between 25° C. and 55° C., and more preferably between 30° C. and 40° C.

This step which is performed in a medium poor in oxygen, and without adding any specific inoculum, allows acidification of the liquid phase and release of ferric and/or ferrous ions, as well as release of phosphate ions into the liquid phase.

According to the method of the present invention said substrates are introduced in the lactic fermentation step at a concentration above 0.2 g COD/g VSS, preferably equal or above 0.5 g COD/g VSS (wherein COD refers to chemical organic demand and VSS to volatile suspended solids).

The lactic fermentation step is advantageously followed by a liquid/solid separation step, such as filtration or centrifugation, the liquid fraction which is recovered after said separation step being put into contact with a material able to fix or to separate iron ions from phosphate ions, such as an adsorbing material or a cationic exchange resin retaining the iron ions from the liquid fraction and providing a solution substantially free of iron. Afterwards the cationic exchange resin or the adsorbing material is regenerated by means of an eluent solution, eluting the iron ions in a form that can be then reused in the waste water treatment plant. For instance, the cationic exchange resin or the adsorbing material could be regenerated by means of an hydrochloric acid solution, eluting the iron ions in the form of a ferric chloride solution.

The method according to the present invention is thus a method allowing the recycling of iron in the form of ferric salts in waste water treatment plants. This method can therefore be used in waste water treatment plants which include a flocculation and/or a dephosphatation step by ferric chloride. This results in a substantial saving in ferric chloride additive, which is a reagent the cost of which represents a larger part of the working costs of a waste water treatment plant.

In addition, the above fermentation which leads to iron dissolution allows simultaneously dissolution of phosphate ions which is described thereafter.

Phosphorus Recovery:

In a first embodiment of the method of the present invention for recovering phosphorus, the lactic fermentation process is performed in the following sequential steps:

i) a pre-fermentation step where sludge is pre-fermented with said substrates at a low COD charge, preferably about 0.2 g COD/g VSS, leading to organic acids production and a pH about 6, to release phosphorus from the sludge, ii) a lactic fermentation step where pre-fermented sludge is fermented with said substrates at a higher COD charge, preferably equal or above 0.5 g COD/g VSS leading to more organic acids production and to a pH about 4, obtaining phosphorus and iron dissolution in the liquid phase, and said lactic fermentation process is followed by:

iii) a liquid/solid separation step for obtaining a liquid fraction, named first solution, iv) an iron fixation step where said first liquid solution is contacted with a cationic exchange resin or with an adsorbent material, obtaining a second liquid solution, which is poor in iron ions or substantially free from iron ions, v) and a precipitation step by providing a magnesium source or a calcium source and increasing pH above 7 to precipitate phosphorus from said second liquid solution.

In a second embodiment of the method of the present invention for recovering phosphorus, the lactic fermentation process is performed:

a) under a single lactic fermentation step where said sludge is fermented with substrates at a COD charge equal or above 0.3 g COD/g VSS, preferably equal or above 0.5 g COD/g VSS, leading to organic acids production and to a pH decrease to a pH value equal or below 5, preferably to a pH about 4, obtaining iron and phosphorus dissolution in the liquid phase, and said lactic fermentation process being followed by:

b) a liquid/solid separation step for obtaining a liquid fraction, named first liquid solution, c) an iron fixation step where said first liquid solution is contacted with a cationic exchange resin or with an adsorbent material, obtaining a solution, named second solution, which is poor in iron ions or substantially free from iron ions, d) and a precipitation step by providing a magnesium source or a calcium source and increasing pH above 7 to precipitate phosphorus from said second solution.

Both methods comprising single step lactic fermentation or two-steps lactic fermentation as described above allow phosphorus and iron ions dissolution followed by separate recovery of iron and phosphorus ions.

Therefore, dissolving and removing iron from the liquid phase allows an increase in the recovery yield of phosphorus, without impairing the quality of the obtained product (struvite or calcium phosphate), which can be used as good fertilizer.

BRIEF DESCRIPTION OF THE DRAWINGS

The present invention will be further described in the below examples given with reference to the accompanying drawing, in which.

DETAILED DESCRIPTION OF INVENTION—EXAMPLES

Sludge Samples:

For example 1: the sludge samples were obtained from five different waste water treatment plants. Plant S1 includes a controlled biological dephosphation step, plant S2 and row 1 of plant S4 (S4-1) include nitrogen and carbon treatment steps that induce development of dephosphating bacteria. Plant S3 and row 2 of plant S4 (S4-2) have essentially dephosphatation by addition of ferric chloride. The molar ratios total Fe/total P in the sludge are comprised between 0.4 and 1.2.

The sludge sample used for the tests of example 2 was obtained from a waste water treatment plant (WWTP) treating 360000 population equivalent. It was sampled after thickening by a belt press. Secondary treatment in the WWTP consists of oxidation ditches designed to achieve Enhanced Biological Phosphorus Removal (EBPR). $FeCl_3$ is applied as complementary P treatment to ensure the legislation limits. Said sludge composition for example 2 (after storage at 4° C.) is presented in table 1 below:

TABLE 1

| | |
|---|---|
| total solids TS (g · kg$^{-1}$) | 27 |
| total volatile solids TVS (g · kg$^{-1}$) | 19 |
| total suspended Solids TSS (g · kg$^{-1}$) | 25 |
| volatile suspended solids VSS (g · kg$^{-1}$) | 18 |
| total fixed solids TFS (g · kg$^{-1}$) | 8.1 |
| pH | 6.8 |
| total phosphorus TP (g · kg$^{-1}$) | 0.8 |
| N—$NH_4^+$ (mg · L$^{-1}$) | ND |
| $Ca^{2+}$ (mg · L$^{-1}$) | 32 |
| $Mg^{2+}$ (mg · L$^{-1}$) | 11 |
| $K^+$ (mg · L$^{-1}$) | 35 |
| N—$NO_2$— (mg · L$^{-1}$) | 0.6 |
| N—$NO_3^-$ (mg · L$^{-1}$) | 0.1 |
| P—$PO_4^{3-}$ (mg · L$^{-1}$) | 12 |

Preliminary tests have shown that a storage time between 24 and 240 hours does not impair the dissolution mechanisms.

Analysis:

Total solids (TS), volatile solids (VS), total Kjeldahl nitrogen (TKN) and chemical oxygen demand (COD), were measured with standard methods [21]. After an acidic mineralization (110° C., 1 bar, 60 min), total phosphorus (TP) was analyzed by the ascorbic acid method using an automate spectrophotometry (Gallery, Thermo Scientific, method 984366).

The ionic composition of the supernatants after centrifugation (4° C., 20 000 g) and filtration on a 0.45 μm polypropylene membrane was measured with both anion ($Cl^-$, $NO_2^-$, $NO_3^-$, $PO_4^{3-}$, $SO_4^{2-}$) and cation ($Na^+$, $NH_4^+$, $Mg^{2+}$, $Ca^{2+}$, $K^+$) chromatography. A Metrohm 940 Professional Vario IC was equipped with a Metrosep A sup 5 anionic column and a Metrosep C4-250/4,0 column for cations.

Total Phosphorus and iron forms have been determined from ashes obtained after calcination at 550° C. during 4 hours, followed by dissolution in a mixture of sulfuric and nitric acids (75/25) at 120° C. and 1 bar during 1 h.

Total dissolved iron ($Fe^{2+}$ and $Fe^{3+}$) was then measured by an automate spectrophotometry (Gallery, Thermo Scientific, method 984326).

Co-Substrates

For example 1: the co-substrate rich in assimilable carbon is saccharose.

For example 2: the co-substrates selected from milk serum, WWTP grease, urban organic waste and collective restaurant waste were individually used as co-substrates. Urban organic waste, collective restaurant waste, milk serum and WWTP grease were stored at −20° C. The solid co-substrates were cryogenized and triturated to form a homogeneous mixture. The co-substrates were characterized in total COD (TCOD), TP, carbohydrate, lipid and protein contents. The co-substrates compositions are presented in Table 2 below.

TABLE 2

|  | Milk serum | WWTP grease | Collective restaurant | Urban organic waste | White sugar |
|---|---|---|---|---|---|
| TCOD (g · kg$^{-1}$) | 64 | 123 | 315 | 336 | 1170 |
| TP (g · kg$^{-1}$) | 0.6 | 0.2 | 0.4 | 1.4 | NP |
| TKN (g · kg$^{-1}$) | 1.4 | 1.0 | 3.1 | 8.5 | NP |
| N—NH$_4^+$ (g · kg$^{-1}$) | 0.0 | 0.2 | 0.2 | 0.4 | NP |
| Proteins content* | 19.2% | 5.8% | 8.2% | 21.5% | NP |
| Lipids content* | 2.9% | 48.8% | 31.6% | 47.4% | NP |
| carbohydrates content* | 77.8% | 45.4% | 60.2% | 31.1% | NP |

NP: not performed.
*expressed in COD/TCOD.

As Comparative Example: Chemical Acidification

Chemical acidification tests by hydrochloric acid (12 M) were run to estimate the fraction of P released by chemical mechanism during biological acidification. Dilutions caused by the acid dosage were negligible. pH was maintained stable for 15 min at each pH value under continuous stirring (250 RPM) and then lowered from 1 unit till reaching pH 2. Acidified waste activated sludge was sampled at every pH unit. Soluble P (P—$PO_4^{3-}$) and total dissolved iron ($Fe^{2+}$+$Fe^{3+}$) concentrations were determined in the supernatant. P—$PO_4^{3-}$ dissolution was found to be a polynomial function, which was used to estimate the contribution of chemical dissolution during the biological process. The iron dissolution curve was also a polynomial function.

Biological Acidification Tests:

The reactors used on sludge fermentation tests were Erlenmeyer flasks with a total volume of 1280 mL, filled with 640 mL during tests. The reactors were placed on heating plates with magnetic stirring. The reaction temperature was set to 35° C., which corresponds to a mesophilic condition, such as most of the anaerobic digesters in France. A thermally insulated box was used as a cover to promote a homogeneous temperature.

The reactors were closed with a rubber septum, which allowed the insertion of needles for pressure measurement, gas collection or injection, as well as reagents dosage. In every experience start or flask opening, the atmosphere was inerted with nitrogen gas for at least 20 minutes (1 mm·min$^{-1}$). Glass taps were adapted to the reactor's bottom for sampling without opening the reactors. The internal pressure generated by the gas production during fermentation ensured that no oxygen was reintroduced during sampling. Overpressure was daily removed with a needle through the rubber septum to avoid vial burst. Repeatability was assessed prior to the operation of these experiments by triplicates with sugar at loads of 2-5 gCOD·gVS$^{-1}$ and provided more than 95% repeatability on pH and soluble P.

Example 1: One-Step Acidification

A co-substrate rich in easily degradable carbon (saccharose) at a ratio of 0.5 gCOD·gVS$^{-1}$ was added to sludge in the above described reactors under nitrogen, at 35° C. under weak agitation during 48H.

Figure 1:
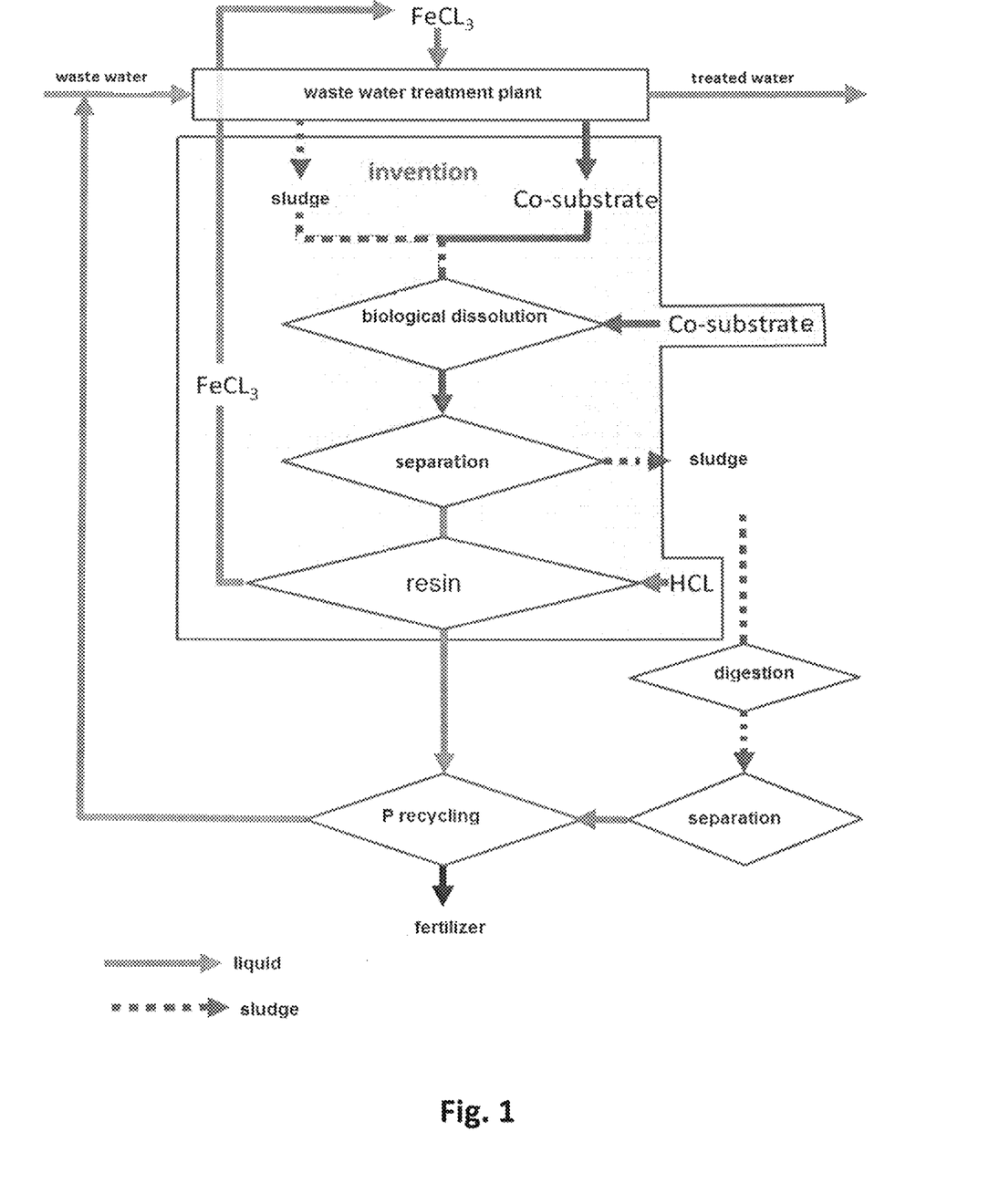
FIG. 1 is a schematic diagram of the various treatment steps performed in a waste water treatment plant including the method of the present invention (dotted arrows represent the sludge circuit)
Figure 2:
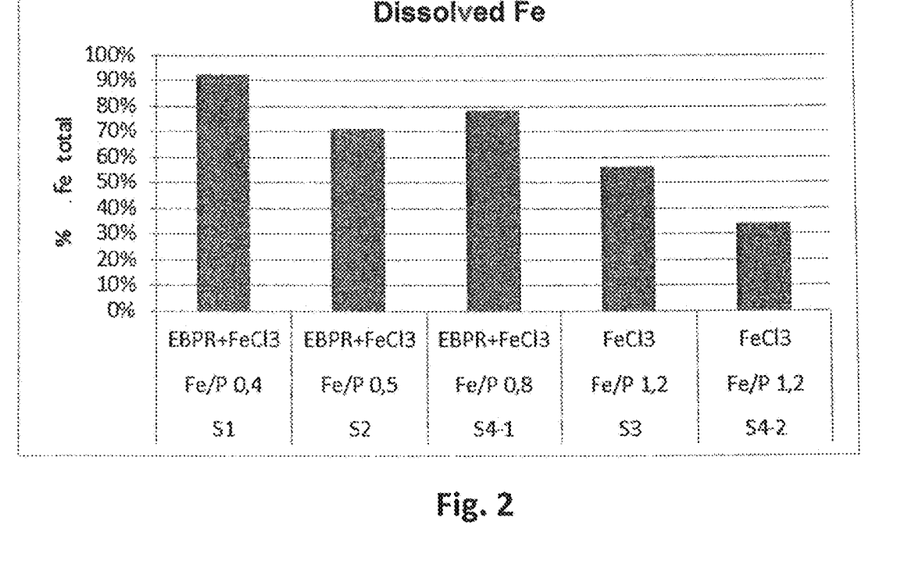
FIG. 2 is a scheme showing the quality of the dissolved iron after one-step biological acidification according to the method of the present invention with sludges issued of different waste water treatment plants (in reference to the treatment steps: EBP refers to biological dephosphatation—$FeCl_3$=dephosphatation by ferric chloride)

FIG. 2 presents the results on the five sludge samples. The fraction of iron dissolved by biological acidification varies from 33% for a plant with dephosphatation with only ferric chloride up to 92% on the sludge from plant S1 having a controlled biological dephosphatation.

Compared to chemical acidification tests at lower pH on sludge issued from plant S1 which have not managed to dissolve more than 20% of iron from the sludge, biological acidification shows interesting improvement.

Figure 3:
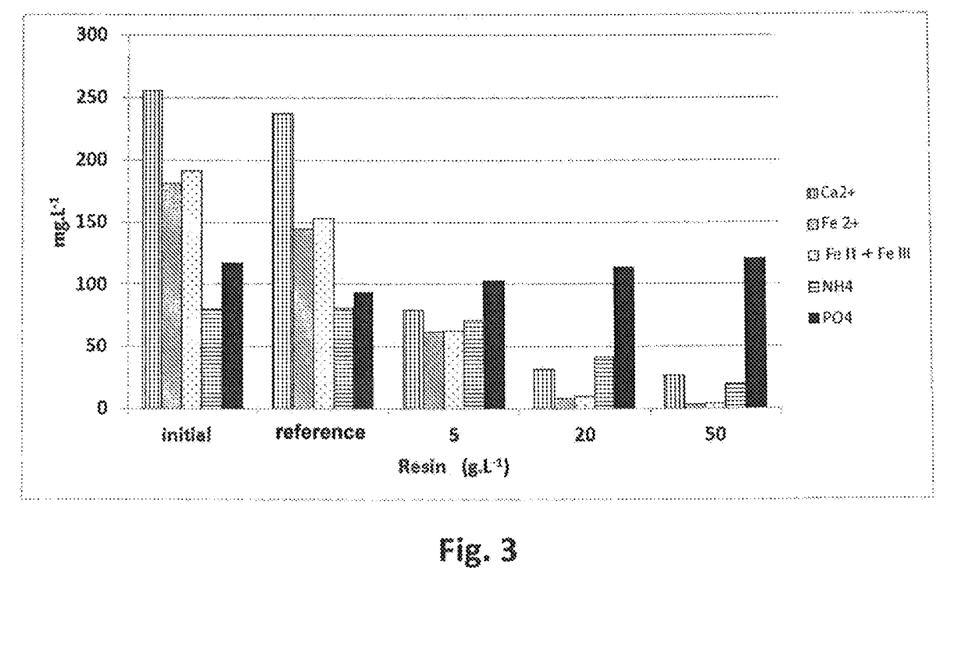
FIG. 3 represents the remaining ions concentration in the liquid fraction (which has been separated from the one-step biologically acidified sludge) after «fixation» on various amounts of a cationic exchange resin.

Separation of the acidified sludges from its liquid phase in which have been dissolved iron and phosphorus is performed by centrifugation. Fixing iron ions on a cationic exchange resin on the liquid fraction obtained after centrifugation of the acidified sludge from plant S4-1. Resin is a DOWEX type Marathon C. Initial pH of the liquid fraction was 4.81. Increased amounts of resin (5, 20 and 50 g·L$^{-1}$ respectively) were added, and the mixtures were put under agitation at ambient temperature (20° C.) during 1 h. A reference without resin is added to the list. It is noted that an amount of 5 to 20 g of resin per liter of the liquid fraction issued from the biological acidification allows fixing most of the iron. Results are presented on FIG. 3. It should be observed that the concentration of the dissolved P is not modified.

Regeneration of the resin is performed with an eluent comprising a 4% HCL solution. Iron is then eluted in the form of ferric chloride, that may be recycled into the waste water treatment plant.

Example 2: Sequencing Acidification

Figure 4:
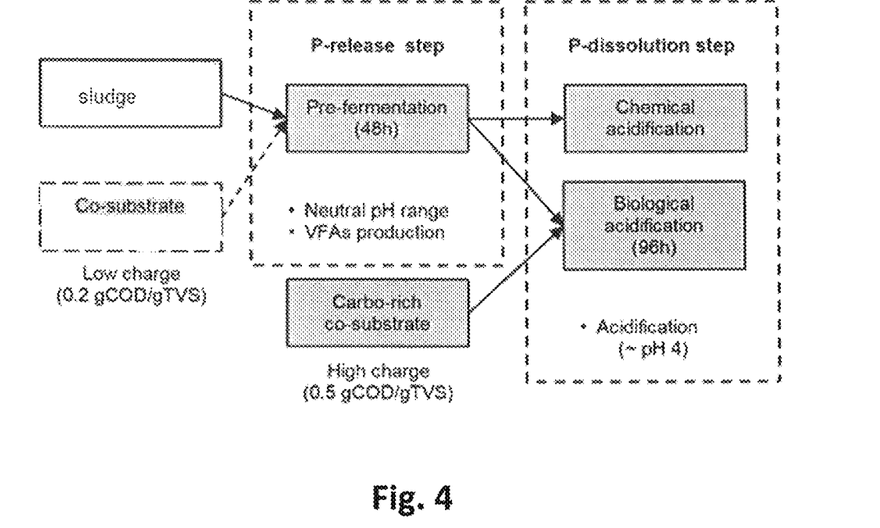
FIG. 4 is a schematic diagram of the two embodiments of the invention for phosphorus recovery, presenting the sequencing acidification strategy.

The principle of the sequencing acidification is presented in FIG. 4. The first step, in which P-release takes place, was performed in reactors as described above. In this phase, organic acids are produced to enhance intracellular P-release by polyphosphate-accumulating organisms (PAO). However, the co-substrate charge must be limited to avoid an excessive pH reduction and the consequent decrease in the efficiency of PAO's metabolism. The ratio of 0.2 gCOD·gVS$^{-1}$ brings enough carbon for P release, keeping the pH slightly below 6. A control test without co-substrate was performed in the same conditions. After 48 h, a second P dissolution step was performed, where pH was lowered to dissolve the released P which could be precipitated with cations and other previous non-soluble forms. Acidification was performed biologically by the addition of sucrose (white sugar) as a carbohydrate-rich co-substrate model (0.5 gCOD·gVS$^{-1}$ during 48 h) or by chemical dosage (HCl 12M). Two strategies of chemical acidification were evaluated only in the control test: sample acidification to pH 4 (R2) and reactor acidification to pH 4 with reaction continuation (R1).

Excluding iron phosphates, pH 4 is sufficient to prevent readily precipitation of released P with amorphous calcium phosphate and/or struvite, the most common forms. Stronger acidifications could induce operational problems such as subsequent excessive chemical needs on pH increase to allow struvite crystallization, methanogenesis inhibition and inefficiency on dewatering processes.

The above experiment plan is summarized in Table 3.

TABLE 3

| Reactor | Total P | Co-substrate | Load gCOD/gVS | +48 h Acidified sample | Reactor intervention |
|---|---|---|---|---|---|
| R1 | 782 | Control | 0 | to pH 4; | Continuing at pH 4 (HCl addition) |
| R2 | 782 | Control | 0 | — | white sugar addition, 0.5 gTCOD/gTVS load |
| R3 | 786 | Collective restaurant | 0.2 | to pH 4 | white sugar addition, 0.5 gTCOD/gTVS load |
| R4 | 796 | Urban organic waste | 0.2 | to pH 4 | white sugar addition, 0.5 gTCOD/gTVS load |
| R5 | 833 | Milk serum | 0.2 | to pH 4 | white sugar addition, 0.5 gTCOD/gTVS load |
| R6 | 765 | WWTP grease | 0.2 | to pH 4 | white sugar addition, 0.5 gTCOD/gTVS load |

Figure 5:
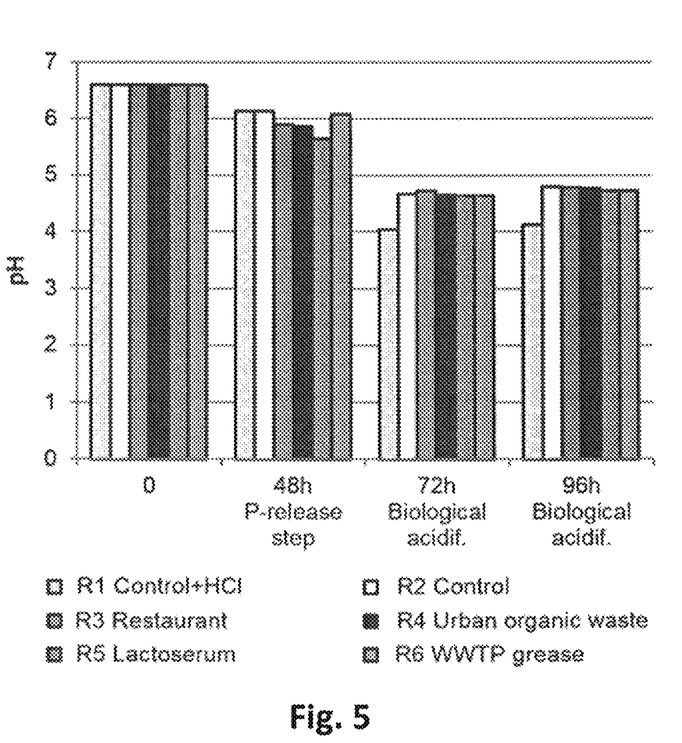
FIG. 5 shows the pH evolution by the two-step sequencing acidification without or with addition of various carbon-rich co-substrates.

After 48 h of P-release step, it was observed a slightly lower pH with lactoserum as co-substrate (5.6) and similar values in the other tests: 6.1 to control and WWTP grease and 5.9 to the restaurant and urban organic wastes (FIG. 5).

A greater difference is observed on soluble P, which represents 19% of the total P for the control test and about 30% with organic co-substrates application (FIG. 5). The higher total P value due to the higher P supply caused by lactoserum application (Table 2) may partially explain the greater soluble P amount in this test, but not the difference between the other tests and the control.

Figure 6:
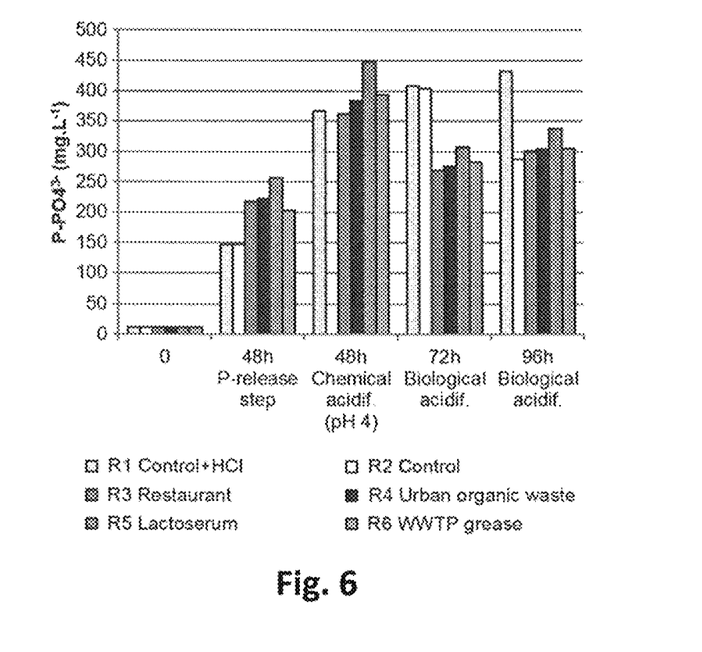
FIG. 6 shows the phosphate evolution by the two-step sequencing acidification without or with addition of various carbon-rich co-substrates.

After white sugar addition, a quick pH drop was observed from about 6.0 to 4.7 in all tests, but the goal of biological acidification was also pH 4. After that, it remained approximately stable until 96 h of reaction (FIG. 5). Following the acidification, soluble P concentrations (P—PO$_4^{3-}$) increased and reached about 40% of the total P after 96 h in all tests. A maximum of 52% soluble P was obtained in the control test with a retention time of 72 h (FIG. 6).

After P-release step, 24 h of biological acidification (total retention time of 72 h) contributed with more 6-10% (actual waste) and 33% (both control tests) of soluble P, but there was no significant extra P solubilisation with 48 h of biological acidification (total of 96 h). Biological acidification reached pH 4.7 and chemical acidification was performed to achieve pH 4. This pH difference may explain different soluble P concentrations since it opposes precipitation of P with available cations.

Regardless of the applied method, soluble P did not exceed 55%, what is significantly lower than the 75% value previously obtained by directly adding white sugar on 0.5 gCOD·gVS$^{-1}$ organic charge at the beginning of the pre-fermentation with sludge from the same waste water treatment plant.

Figure 7:
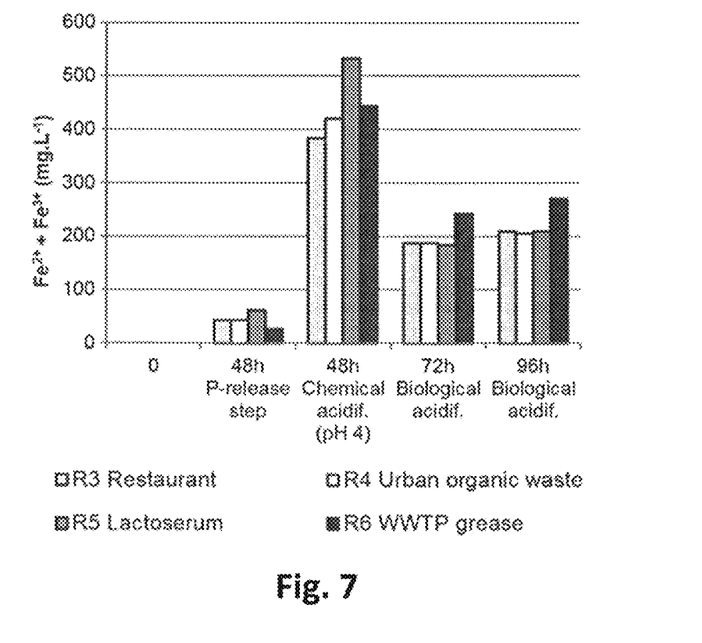
FIG. 7 shows the iron evolution by the two-step sequencing acidification without or with addition of various carbon-rich co-substrates.

Dissolved iron concentrations (Fe$^{2+}$ and Fe$^{3+}$) after chemical acidification of pre-fermented sludge were between 400 and 500 mg·L$^{-1}$ (FIG. 7). These values are greater than those obtained with biological sequencing acidification which does not exceed 280 mg·L$^{-1}$ at pH 4.7.

Soluble iron concentrations were much greater with the application of sequencing acidification than with chemical acidification of sludge without pre-fermentation: 102, 66 and 35 mg·L$^{-1}$ at pH 2, 3 and 5 respectively. This result confirms the role of pre-fermentation metabolism that would turn iron into more sensible to acidification forms.

Recovery of iron and phosphorus can then be performed according to example 1.

IN CONCLUSION

Strong acidification, induced by a large amount of easily biodegradable organic matter in a single lactic fermentation step of sludge may reduce biological P-release by PAO.

Therefore, dissociating P-release and P-dissolution by applying a two-step sequencing acidification strategy brings the main conclusions below:

Sequencing acidification with chemical dosage is more effective (about 50% of soluble P at pH 4) than biological sequencing acidification (about 40% at pH 4.7) but both presented better results than chemical-only acidification (maximum of 11% at pH 3.4).

Biological acidification with the applied organic charge did not reach pH 4 probably due to a great amount of ammonium mineralized during the first 48 hours of P-release step which may have increased the buffering capacity.

Sequencing acidification strategy showed to be less effective than the input of a larger amount of easily biodegradable COD at the beginning of the tests.

The invention claimed is:

1. Method of recovering iron, phosphorus, or both from sludge of waste water treatment plants, said sludge previously obtained by precipitation by iron salts, said method comprising the steps of:
   separating sludge from waste water; and
   submitting said sludge to a lactic fermentation to release a liquid phase, where iron and phosphorus are dissolved.

2. Method according to claim 1, wherein the step of dissolving of iron and phosphorus into said liquid phase comprises submitting said sludge to lactic fermentation with substrates that contain biodegradable carbon.

3. Method according to claim 2, wherein said substrates include carbohydrates, leading, during lactic fermentation, to organic acids production and acidification of the medium to a pH value equal or below 5.

4. Method according to claim 3, wherein said substrates containing carbohydrates are chosen among saccharose, glucose, agricultural industrial or urban organic wastes, crops and crop residues or parts or extracts thereof.

5. Method according to claim 2, wherein said lactic fermentation step is an anaerobic or anoxic fermentation step, carried on at a temperature comprised between 20° C. and 60° C.

6. Method according to claim 2, wherein said substrates are introduced in the lactic fermentation step at a concentration above 0.2 g COD/g VSS.

7. Method according to claim 2, wherein the lactic fermentation step is followed by a liquid/solid separation step, the liquid fraction recovered after said separation step being put into contact with a material able to fix or to separate iron ions from phosphate ions.

8. Method according to claim 7, wherein the cationic exchange resin or the adsorbing material is regenerated by an eluent solution, eluting the iron ions in a form that can be reused in the waste water treatment plant.

9. Method according to claim 8, wherein the cationic exchange resin or the adsorbing material is regenerated by an hydrochloric acid solution, eluting the iron ions in the form of a ferric chloride solution.

10. Method according to claim 9, wherein said method includes recycling iron in the form of ferric salts in waste water treatment plants.

11. Method according to claim 9 being used in waste water treatment plants which include a flocculation step, a dephosphatation step, or both, by ferric chloride.

12. Method according to claim 7, for recovering phosphorus, wherein the lactic fermentation process is performed in the following sequential steps:
  i) a pre-fermentation step where sludge is pre-fermented with said substrates at a low COD charge, leading to organic acids production and a pH about 6, to release phosphorus from the sludge,
  ii) a lactic fermentation segment where said pre-fermented sludge is further fermented with said substrates at a higher COD charge, leading to more organic acids production and to a pH about 4, obtaining phosphorus dissolution in the liquid phase, and said fermentation process is followed by:
  iii) said liquid/solid separation step for obtaining a liquid fraction, named first liquid solution
  iv) an iron fixation step where said first liquid solution is contacted with a cationic exchange resin or with an adsorbent material, obtaining a second liquid solution substantially free from iron ions,
  v) and a precipitation step by providing a magnesium source or a calcium source and increasing pH above 7 to precipitate phosphorus from said second liquid solution.

13. Method according to claim 7, for recovering phosphorus, wherein the lactic fermentation process is performed:
  a) under a single lactic fermentation phase where said sludge is fermented with substrates at a COD charge equal or above 0.3 g COD/g VSS, leading to organic acids production and to a pH decrease to a pH value equal or below 5, obtaining iron and phosphorus dissolved in the liquid phase, and said lactic fermentation process is followed by:
  b) said liquid/solid separation step for obtaining a liquid fraction, named first liquid solution,
  c) an iron fixation step where said first solution is contacted with a cationic exchange resin or with an adsorbent material, obtaining a second liquid solution, substantially free from iron ions,
  d) and a precipitation step by providing a magnesium source or a calcium source and increasing pH above 7 to precipitate phosphorus from said second liquid solution.

* * * * *